US012730424B2

(12) United States Patent
Daniel et al.

(10) Patent No.: US 12,730,424 B2
(45) Date of Patent: Sep. 8, 2026

(54) INJECTION MOLDING APPARATUS

(71) Applicant: INGLASS S.P.A., San Polo di Piave (IT)

(72) Inventors: Roberto Daniel, San Polo di Piave (IT); Stefano De Iesu, San Polo di Piave (IT)

(73) Assignee: INGLASS S.P.A., San Polo di Piave (IT)

(*) Notice: Subject to any disclaimer, the term of this patent is extended or adjusted under 35 U.S.C. 154(b) by 622 days.

(21) Appl. No.: 18/144,884

(22) Filed: May 9, 2023

(65) Prior Publication Data

US 2023/0367276 A1 Nov. 16, 2023

(30) Foreign Application Priority Data

May 13, 2022 (IT) ........................ 102022000010004

(51) Int. Cl.
*G05B 19/042* (2006.01)

(52) U.S. Cl.
CPC .... *G05B 19/042* (2013.01); *G05B 2219/2624* (2013.01)

(58) Field of Classification Search
CPC .......... G05B 19/042; G05B 2219/2624; B29C 2945/76602; B29C 2945/76755; B29C 2945/76859; B29C 2945/76939; B29C 2945/76993; B29C 45/76; B29C 45/80; B29C 2045/2824; B29C 45/281
See application file for complete search history.

(56) References Cited

U.S. PATENT DOCUMENTS

2022/0212384 A1* 7/2022 Hansen .................. B29C 45/78

FOREIGN PATENT DOCUMENTS

JP 2020049703 A 4/2020
WO WO-2022072598 A1 * 4/2022 ............ B29C 45/76

* cited by examiner

*Primary Examiner* — Chad G Erdman
(74) *Attorney, Agent, or Firm* — Rivka Friedman

(57) ABSTRACT

An injection molding apparatus is described. It comprises a press equipped with a screw for generating molten material, and a signal generator for generating a control signal adapted for a plurality of directional valves so that they can regulate the movement of one or more actuators adapted for controlling the movement of one or more shutters which regulate a flow of molten material to the mold.

There is a signal converter connected between the press and the mold for converting the signal emitted by the generator into a signal adapted for activating one or more electric actuators, wherein the signal converter is external to the press and the mold.

20 Claims, 1 Drawing Sheet

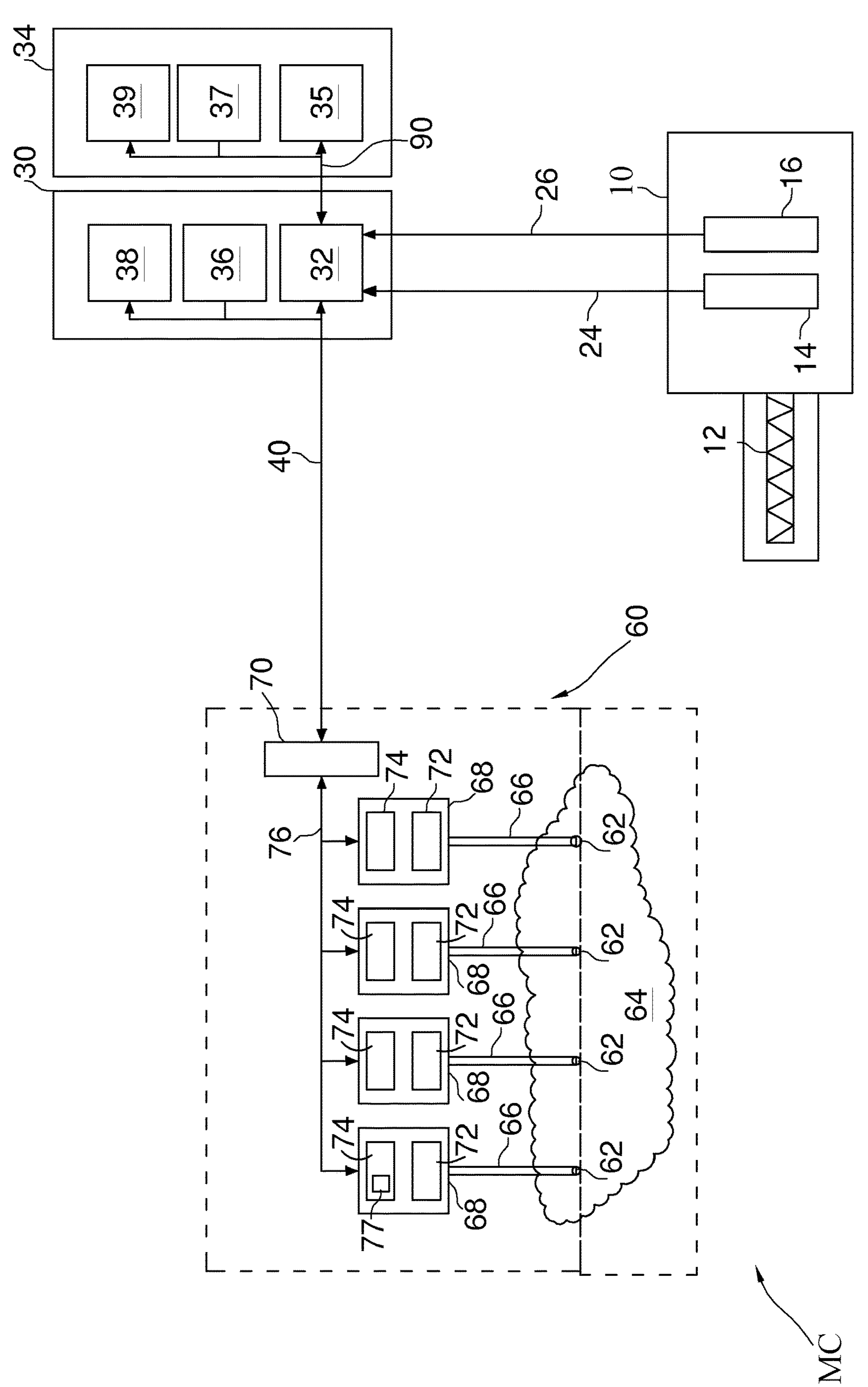
34
39
37
35
90
30
38
36
32
26
10
16
24
14
12
40
60
70
74
72
68
66
76
62
64
77
MC

INJECTION MOLDING APPARATUS

TECHNICAL FIELD

The invention relates to an injection molding apparatus.

BACKGROUND

Injection molding machines (IMMs) are known to have a cylindrical screw that can be driven by appropriate electric or hydraulic actuators to create a flow of molten material to be injected, and a heated manifold/distributor that receives the flow and distributes it to one or more injectors toward one or more cavities of a mold. Upon request, manufacturers customize the IMM so that it generates a primitive digital ON/OFF signal when the screw begins to push molten material, or stops, or reaches a predetermined position, and/or an analog signal indicating the continuous position of the screw. This signal is fed as input to an electronic controller designed to control the opening and closing sequence of the shutters that regulate the flow of molten material exiting each injector.

The shutters are operated by pneumatic, oil-dynamic or electric actuators. When the shutter is operated by a pressurized-fluid actuator controlled by directional pneumatic valves connected to the controller, it can only move between two start and end positions (closed position and maximum open position, respectively).

More sophisticated and high-performance molding methods require injecting the molten material according to a defined progression (in a controlled manner), which is achieved by moving the shutters finely between the two end positions. For this purpose, the shutters are driven by pneumatic actuators regulated by proportional valves or by electric actuators (geared motors). However, such proportional valves and electric motors cannot be driven neither by the primitive signal of the IMM nor by the commands generated for the directional valves.

The system in U.S. Pat. No. 10,569,458B2 describes a converter 1500 that transforms an injection system suitable for controlling directional valves into a system having proportional valves or electric motors to control the shutters. The converter 1500 generates appropriate control signals for pneumatic or electric actuators starting from the primitive signal of the IMM. The converter 1500 incorporates a controller 16 programmed to command the movement of the shutters to any position within their stroke or according to a predetermined speed profile.

U.S. Pat. No. 10,569,458B2 gives no details about the precise configuration of the converter 1500.

SUMMARY

The main object of the invention, defined in the attached claims in which the dependent ones define advantageous variants, is to improve this state of the art.

Another object is to simplify the remote operation of an injection system.

Another object is to improve the security of data regarding injection parameters, preventing them from being lost and thus facilitating the operator/user.

At least one object is achieved by an injection molding apparatus comprising:

- a press equipped with
  - a (e.g. cylindrical) screw to generate molten material to be injected into a mold, and
  - a signal generator for generating a control signal adapted to drive a plurality of directional valves so that they can regulate the movement of one or more actuators adapted to control the movement of one or more shutters which regulate a flow of molten material toward a mold,
- a signal converter connected between the press and the mold to convert the signal emitted by the generator into a signal adapted for activating and/or driving one or more electric actuators in the mold,
- wherein the one or more electric actuators are associated with a related shutter to regulate the flow of molten material from a nozzle toward the mold,
- wherein the signal converter is external to the press and the mold.

A signal converter external to the press is more easily insertable as a bridge between components of the injection cell, thereby minimizing modifications to the press and mold. Because the signal converter is external, it allows for improved remote operation of an injection system because communication channels are easier to interface to it than to a press or mold, which are natively ill-suited for such sophistications. In addition, the external signal converter facilitates the circulation of data regarding the injection parameters, disassociating them from the press and/or constituting a data transit node external to the press (thereby preventing the data from remaining attached to the press).

The external signal converter facilitates the circulation of data regarding the injection parameters by dissociating them from the press, and prevents them from being lost.

The external signal converter enables:

- substantial economic savings for the user since it can be used from time to time with different and multiple molds. In this way, it is not necessary to purchase a converter for each mold but is sufficient to purchase one converter per production site;
- the handling of the mold between different production sites (different IMMs) thereby simplifying the subsequent necessary installation procedure, where multiple parameters need to be re-set/programmed in the new IMM;
- to avoid adding control and management hardware to the mold as it requires considerable space.

In a variant, the apparatus comprises the mold, which preferably comprises:

- one or more cavities,
- one or more heated manifolds/distributors to receive molten material from the press and distribute it to one or more injectors each equipped with a nozzle and shutter adapted to regulate the flow of molten material exiting the nozzle toward the cavity, and
- one or more electric actuators, e.g. mounted on the mold plates or manifolds, associated with each injector to move the corresponding shutter.

In a variant, the one or more actuators

- comprise on board an electronic unit and a memory in which there is stored at least one dynamic profile for the movement of the respective shutter during the opening and closing phase of the nozzle, and
- are configured to independently impose such profile to the shutter when they receive a start signal from the converter. Thus the converter need only generate a sequence of signals indicating the instants of activation for the actuators.

In another variant, the converter

- comprises a memory in which at least one dynamic profile for the movement of a shutter during the opening and closing phase of the nozzle is stored, and
- is configured to transmit such profile to an actuator to carry it out. Thus the profile is stored in the converter and is easily accessible.

Preferably, the converter comprises a programmable unit (a PLC, a microcontroller, or a PCB) to manage its functions.

Specifically, the converter comprises a data memory, and the programmable unit is configured to

- send data into the memory of the electronic unit provided in a or each actuator and/or
- save data in the memory of the converter by taking them from the memory of the electronic unit in a or each actuator.

Thus the converter improves the programming of the electric actuators on board a mold, not only by serving as a nonvolatile database, but also by improving the programming functions by being able to be equipped with features or computing power not normally found on a press.

Preferably, for ease of operation, the apparatus comprises a graphical human-machine interface separate from the converter and connectable/connected to the converter to exchange data with the converter.

In particular, the graphical human-machine interface is connected/connected to the converter via cable or wireless means to facilitate connections.

Specifically, the graphical human-machine interface comprises a data memory, and the graphical human-machine interface is configured to

- send data to the memory of the electronic unit provided in an or each actuator and/or the memory of the converter, and/or
- save data in the memory of the graphical interface by taking them from the memory of the electronic unit provided in an or each actuator and/or from the memory of the converter.

Thus, even the graphical human-machine interface improves the programming of the electric actuators on board a mold, not only serving as a nonvolatile database, but also enhancing the programming functions by being able to be equipped with features or computing power not normally found on a press.

Preferably, the programmable converter unit and/or the graphical human-machine interface is configured to

- program an opening and closing sequence for the actuators and transmit the sequence to the actuators, and/or
- program a dynamic opening and closing profile for the shutter of an or each actuator and transmit it to an or each actuator, and/or
- send configuration data to each actuator.

Preferably, the graphical human-machine interface comprises communication means toward a remote device, e.g. a network interface card. Thus, remote communication or management is facilitated.

Preferably, the converter converts a signal comprising a digital signal indicating the start of the injection thrust by the screw and/or a signal (e.g. analog) indicating the linear position of the screw, and/or a digital post-pressure signal or indicative of the closed mold, or dosage, and/or an analog signal indicative of the hydraulic pressure of the screw.

BRIEF DESCRIPTION OF THE DRAWINGS

The advantages of the invention will be even clearer from the following description of a preferred system, in which FIG. 1 shows the schematic of an injection system MC.

DETAILED DESCRIPTION

In the FIGURE equal elements are indicated by equal numbers, and to avoid crowding the drawings sometimes only a few numbers are shown.

A well-known injection molding machine 10 is equipped with a cylindrical screw 12 capable of generating a flow of molten material to be injected into a mold 60. On board the press 10 there are ordinarily a first generator 14 of a first signal and/or a second generator 16 of a second signal. The first signal is a digital signal indicating the start of the injection thrust by the screw 12, while the second signal is a signal (e.g. analog) indicating the linear position of the screw 12.

In a known manner, the mold 60 comprises a heated manifold/distributor (commonly referred to as a hot runner) to receive molten material from the press 10 and distribute it to one or more nozzles 62 toward a mold cavity 64 (analogously, the mold may comprise several different and/or equal cavities). The flow of plastic material exiting each nozzle 62 is regulated by a respective known shutter 66 (valve pin) translatable between a closed position, in which there is no discharge of molten plastic material, and an open position, in which there is discharge of plastic material. The shutter 66 is driven by a respective electric actuator 68 (preferably an electric rotary gear-motor) installed on a plate making up the mold 60 and/or on the manifold/distributor.

Each actuator 68 comprises a power electronic circuit 72 to drive the respective shutter 66 and an electronic unit 74 that manages the power electronic circuit 72, e.g. to achieve a desired dynamic motion profile for the shutter 66.

Each electronic unit 74 comprises a memory 77 to store therein:

- instructions for executing a position and/or velocity and/or torque and/or pressure profile to be followed by the actuator 68 (each unit 74 may contain several dynamic profiles different from each other); and/or
- data on a position and/or speed and/or torque and/or pressure profile to be followed by the actuator 68; and/or
- the mechanical configuration of what will be connected downstream of the actuator 68 or including the actuator 68 or downstream of the power unit 72 (if the actuator 68 is also a variable), e.g. the type of jack (on chamber or on plate, or the presence of the 90 degree lever, or the length of the extension arm), the size of the shutter 66 (e.g. diameter of 5 mm, 10 mm, etc.), the type of ferrule at the end of the nozzle 62 (pass-through or in FIGURE), or other. Said mechanical configuration determines the mechanical characteristics of the entire kinematic chain downstream of or including the actuator 68, so this information is advantageous later for the proper configuration of the drive system. By knowing the mechanical configuration one can control the actuator 68 appropriately, correctly setting e.g. the maximum torques, maximum strokes, the reduction and transmission ratios, applicable or required power, etc. These parameters vary with the life and use of the mold so they can be appropriately updated manually or automatically;

optionally all subsequent useful parameters required for the operation of the injection process(es) (e.g. speed profiles, adjustments, triggers, etc.).

Two or more actuators 68 can be cascaded in order to control multiple shutters 66 with the same signal.

A line 24 carries the signal from the generator 14 outside the press 10 to a signal converter 30 interposed between the press 10 and the components on the mold 60. A line 26 carries the signal of the generator 16 outside the press 10 to the converter 30. The two signals would ordinarily serve to drive a plurality of well-known directional valves suitable in turn for driving the actuators and thus the shutters. In the system MC, however, the actuators 68 are driven by said two signals through the converter 30 connected externally to the press 10 and the mold 60. The converter 30 is thus a peripheral device, e.g. an electric control box or cabinet.

The converter 30 comprises an electronic circuit 32 (e.g. a microcontroller) designed to convert the first and/or second signal into a control signal for an electric actuator. The electronic circuit 32 interprets the signals on the lines 24, 26 to determine the start and end of the injection phase, and generates appropriate sequence signals on a line 40. The data sent on the line 40 are received by an interface circuit 70 located on the mold 60 that interprets the signals on the line 40 and sorts them to each unit 74 via a bus 76.

The line 40 corresponds to a cable or wireless connection.

The converter 30 also comprises:

a power supply circuit 36 (optional) with which the power supply required for the components on the mold 60 is also sent on the line 40, and/or an internal memory 38 containing process data and/or parameter(s) as well as data from the press(es) 10 or mold(s) 60.

In a variant, the dynamic profile carried out by the actuator 68 resides in the memory 77. The signal sent to each unit 74 by the converter 30 is only a "start" signal, which commands only the starting instant of the movement of the respective shutter 66 according to the dynamic profile stored in the unit 74 itself and carried out independently by the respective actuator 68.

In a different variant, the dynamic profile is stored in the memory 38. In this case, the converter 30 communicates to each actuator 68 both the aforementioned "start" sequence and the dynamic profile to be carried out for the shutter 66 of that actuator 68.

An optional human-machine interface 34, e.g. a tablet, a computer, a touch-screen, or a cell phone, is connectable to the electronic circuit 32 via a line 90 (corresponding to a wired or wireless connection).

The interface 34 is preferably equipped with a memory 35 in which e.g. data and operating parameters of multiple molds 60 belonging to different plants can be saved; and/or a data transmission interface and/or means 39 for (wired or wireless) transmission toward additional remote devices (a database, PC, . . . etc.). E.g., the interface 34 has its own Internet connection 25 for remote support, intervention, or service, or for connection to networks of the customer (MES).

The interface 34 is connectable to the converter 30 via a cable or wireless channel.

In the system MC:

each electronic unit 74 is configured to transmit/receive data to/from the converter 30 and/or to/from the interface 34, and/or the converter 30 is configured to transmit/receive data to/from the interface 34 and/or to/from each electronic unit 74, and/or the interface 34 is configured to transmit/receive data to/from each electronic unit 74 and/or to/from converter 30.

In other words, the converter 30, the interface 34 and the units 74 are connected by a (preferably bidirectional) data communication network.

Thanks to the data network of the system MC, data related to the injection process or to the configuration of its physical parts can then be easily transmitted and stored. Such data can be saved in the memory 38 of the converter 30 or in the memory 35 of the interface 34 or in the internal memory 77 of each unit 74.

In the memory 38 and/or 35 and/or 77 the configuration of the sequential opening sequence of the shutters 66, the opening and closing dynamic profiles of the shutters 66, the parameters that characterize the injection process (temperatures, pressure, time, type of injected material, etc.);

one or more calibrations of the signal on the lines 24, 26 (e.g., 0 Volt=screw 12 located at 0 mm of its stroke, 10 Volts=screw 12 located at 500 mm of its stroke);

a database containing information on injection cycles (torque/position/speed/pressure of each shutter 66 and/or states of the press 10), can be saved.

Advantageously, the data in the memory 38 and/or 35 and/or 77 may regard various groups of actuators 68, even belonging to different molds 60. Since the converter 30 is compatible with different molds 60 and different presses 10, it can be used with different molds 60, even from different plants of different production sites.

In particular, the interface 34 is configured to program and modify the profiles followed by each actuator 68 and e.g. store them in the memory 38 and/or 77, and/or send the profile to be executed to each actuator 68 via the line 40, and/or set trigger conditions for the movement of the shutters 66 with respect to a signal detected by a sensor on the mold 60 (e.g. a pressure and/or temperature sensor), and/or display operating parameters of the system (for this purpose, the interface 34 is e.g. equipped with a display 37. The interface 34 is preferably configured to drive the display 37 in order to display numerical parameters and/or profiles and/or trends of detected quantities such as temperature and/or pressure in the cavity 64, etc.).

In particular, the electronic circuit 32 and/or the interface 34 are configured to download data (e.g. related to mechanical configurations and/or process parameters) into the memory 77 of the unit 74 of a mold 60. If the mold 60 is new, its start-up is then very simple and quick to perform. Equally simple is also the data update of an existing mold 60, even from remote location (tele-service).

If a unit 74 is damaged, it must be replaced. But when it is installed from scratch, the unit 74 is not configured (it has its internal memory empty), and usually the re-programming work is complicated and especially time-consuming (it has to be done by a skilled operator who has to travel to the production site). Instead, thanks to the ability of the controller 30 or the interface 34 to download into the memory 77 of the virgin unit 74 process parameters and/or mechanical characteristics, or any data that was present in the replaced unit 74, the system operation can be restored quickly.

A technician can also operate the system MC remotely and in real time by sending data to the interface 34. The interface 34 receives the data and transfers them to the memory 38 and/or 35 and/or 77 and/or to the circuit 32. Or the data flow can be in the opposite direction.

Thanks to this external connection, the system MC can be managed remotely, and data and parameters can be remotely sent and entered into a or each memory in the system MC.

Note that the architecture of the converter 30 allows the programming part, i.e. the interface 34, to be disconnected during operation and moved to another converter 30 to program a different mold 60.

The system MC architecture has other advantages.

The memory 38 and/or 35 and/or 77 allows the profiles of the actuator 68 to be saved locally.

The opening or closing profile programming for the shutters 68 also remains on the mold 60 once it has been optimized (saved in the memory 77 of the unit 74). When the mold 60 is moved between different production sites, the optimized profiles are not lost and can be activated by connecting a local converter 30 to the mold 60. In this way, local operators do not have to re-program the entire IMM devoting a lot of man-hours to it.

The converter outside the mold allows the use of lower-cost, higher-performance electronics than would have been mounted on the mold given the lower operating temperatures

The invention claimed is:

1. An injection molding apparatus comprising:

a press equipped with a screw for generating molten material for injection into a mold, and a signal generator for generating a control signal adapted for a plurality of directional valves so that they can regulate the movement of one or more actuators adapted for controlling the movement of one or more shutters which regulate a flow of molten material to the mold, a signal converter connected between the press and the mold for converting the signal emitted by the generator into a signal adapted for activating one or more electric actuators mounted in the mold to operate a shutter capable of regulating the flow of molten material from a nozzle toward the mold, the signal converter is external to the press and the mold, wherein the converter comprises a programmable unit configured to send and/or receive data to/from one or each actuator, wherein the one or more actuators comprise on board an electronic unit and a memory in which there is stored at least one dynamic profile for the movement of the respective shutter during the opening and closing phase of the nozzle, and are configured to autonomously impose on the shutter such profile when they receive a start signal from the converter, wherein the converter comprises a data memory, and the programmable unit of the converter is configured for sending data into the memory of the electronic unit provided in an or each actuator and/or saving data in the memory of the converter by taking them from the memory of the electronic unit provided in an or each actuator.

2. The apparatus according to claim 1, wherein the converter comprises a programmable unit configured to send and/or receive data to/from one or each actuator.

3. The apparatus according to claim 2, wherein the converter comprises a data memory, and the programmable unit of the converter is configured for sending data into the memory of the electronic unit provided in an or each actuator and/or saving data in the memory of the converter by taking them from the memory of the electronic unit provided in an or each actuator.

4. The apparatus according to claim 1, comprising a graphical human-machine interface separate from the converter and connectable/connected to the converter for exchanging data with the converter.

5. The apparatus according to claim 4, wherein the graphical human-machine interface comprises a data memory, and the graphic human-machine interface is configured for sending data to the memory of the electronic unit provided in an or each actuator and/or the memory of the converter, and/or saving data in the memory of the graphic interface by taking them from the memory of the electronic unit provided in an or each actuator and/or from the memory of the converter.

6. The apparatus according to claim 5, wherein the graphic interface comprises a programmable unit and the programmable unit of the converter and/or of the graphic interface is configured for programming an opening and closing sequence for the shutters of the actuators and transmit the sequence to the actuators, and/or programming a dynamic opening and closing profile for the shutter of an or each actuator and transmit it to an or each actuator, and/or sending configuration data to each actuator.

7. The apparatus according to claim 5, wherein the programmable unit of the converter and/or of the graphic interface is configured for programming an opening and closing sequence for the shutters of the actuators and transmit the sequence to the actuators, and/or programming a dynamic opening and closing profile for the shutter of an or each actuator and transmit it to an or each actuator, and/or sending configuration data to each actuator.

8. The apparatus according to claim 5, wherein the graphic interface comprises communication means toward a remote device.

9. The apparatus according to claim 4, wherein the graphic interface comprises a programmable unit and the programmable unit of the converter and/or of the graphic interface is configured for programming an opening and closing sequence for the shutters of the actuators and transmit the sequence to the actuators, and/or programming a dynamic opening and closing profile for the shutter of an or each actuator and transmit it to an or each actuator, and/or sending configuration data to each actuator.

10. The apparatus according to claim 4, wherein the programmable unit of the converter and/or of the graphic interface is configured for programming an opening and closing sequence for the shutters of the actuators and transmit the sequence to the actuators, and/or programming a dynamic opening and closing profile for the shutter of an or each actuator and transmit it to an or each actuator, and/or sending configuration data to each actuator.

11. The apparatus according to claim 4, wherein the graphic interface comprises communication means toward a remote device.

12. The apparatus according to claim 11, wherein said means comprise a network card.

13. The apparatus according to claim 4, wherein the graphic human-machine interface is connected/connectable to the converter via cable or wireless means.

14. The apparatus according to claim 13, wherein the graphical human-machine interface comprises a data memory, and the graphic human-machine interface is configured for sending data to the memory of the electronic unit provided in an or each actuator and/or the memory of the converter, and/or saving data in the memory of the graphic interface by taking them from the memory of the electronic unit provided in an or each actuator and/or from the memory of the converter.

15. The apparatus according to claim 14, wherein the graphic interface comprises a programmable unit and the programmable unit of the converter and/or of the graphic interface is configured for programming an opening and closing sequence for the shutters of the actuators and transmit the sequence to the actuators, and/or programming a dynamic opening and closing profile for the shutter of an or each actuator and transmit it to an or each actuator, and/or sending configuration data to each actuator.

16. The apparatus according to claim 14, wherein the programmable unit of the converter and/or of the graphic interface is configured for programming an opening and closing sequence for the shutters of the actuators and transmit the sequence to the actuators, and/or programming a dynamic opening and closing profile for the shutter of an or each actuator and transmit it to an or each actuator, and/or sending configuration data to each actuator.

17. The apparatus according to claim 14, wherein the graphic interface comprises communication means toward a remote device.

18. The apparatus according to claim 13, wherein the graphic interface comprises a programmable unit and the programmable unit of the converter and/or of the graphic interface is configured for programming an opening and closing sequence for the shutters of the actuators and transmit the sequence to the actuators, and/or programming a dynamic opening and closing profile for the shutter of an or each actuator and transmit it to an or each actuator, and/or sending configuration data to each actuator.

19. The apparatus according to claim 13, wherein the programmable unit of the converter and/or of the graphic interface is configured for programming an opening and closing sequence for the shutters of the actuators and transmit the sequence to the actuators, and/or programming a dynamic opening and closing profile for the shutter of an or each actuator and transmit it to an or each actuator, and/or sending configuration data to each actuator.

20. The apparatus according to claim 13, wherein the graphic interface comprises communication means toward a remote device.

* * * * *